United States Patent [19]

Raab

[11] 3,798,402

[45] Mar. 19, 1974

[54] SAFETY SWITCH AND CONTROL SYSTEM FOR VEHICLES

[76] Inventor: Andrew F. Raab, 8908 Mango St., Morton Grove, Ill. 60053

[22] Filed: Apr. 19, 1972

[21] Appl. No.: 245,406

[52] U.S. Cl. ........ 200/161, 123/198 DC, 180/82 R, 200/61.85, 200/153 LA, 200/157
[51] Int. Cl. .... H01h 17/06, F02b 77/08, H01h 9/06
[58] Field of Search ..... 200/161, 157, 61.85, 61.86, 200/61.87, 61.89, 153 V, 153 LA; 180/5 R, 77 R, 82 R, 103; 123/198 DB, 198 DC, 98

[56] References Cited
UNITED STATES PATENTS

| | | | |
|---|---|---|---|
| 3,626,919 | 12/1971 | MacMillan | 123/198 DB |
| 3,672,344 | 6/1972 | Albertson | 123/98 X |
| 2,222,765 | 11/1940 | Geyer | 200/161 X |
| 3,487,183 | 12/1969 | Schulman | 200/61.89 |
| 2,836,669 | 5/1958 | Rosenberg | 200/61.89 |

*Primary Examiner*—Herman J. Hohauser
*Assistant Examiner*—Robert A. Vanderhye

[57] ABSTRACT

A throttle safety switch is connected into the throttle control cable for a snowmobile or other vehicle. When the normal tension in the throttle control cable is lost due to freezing or sticking of the throttle in the open position, the switch is actuated so as to short circuit or otherwise disable the ignition system for the engine on the snowmobile. The switch involves first and second movable members with relative lost motion therebetween. The tension in the control cable normally takes up the lost motion in one direction. When such tension is lost, the lost motion is taken up in the opposite direction by a spring acting between the members. As a result, a pair of contact arms on one of the members are moved outwardly by a camming element on the other member so that the arms engage stationary elongated contact elements connected to the ignition system, such elongated contact elements being engageable by the contact arms throughout the range of movement of the movable members.

22 Claims, 9 Drawing Figures

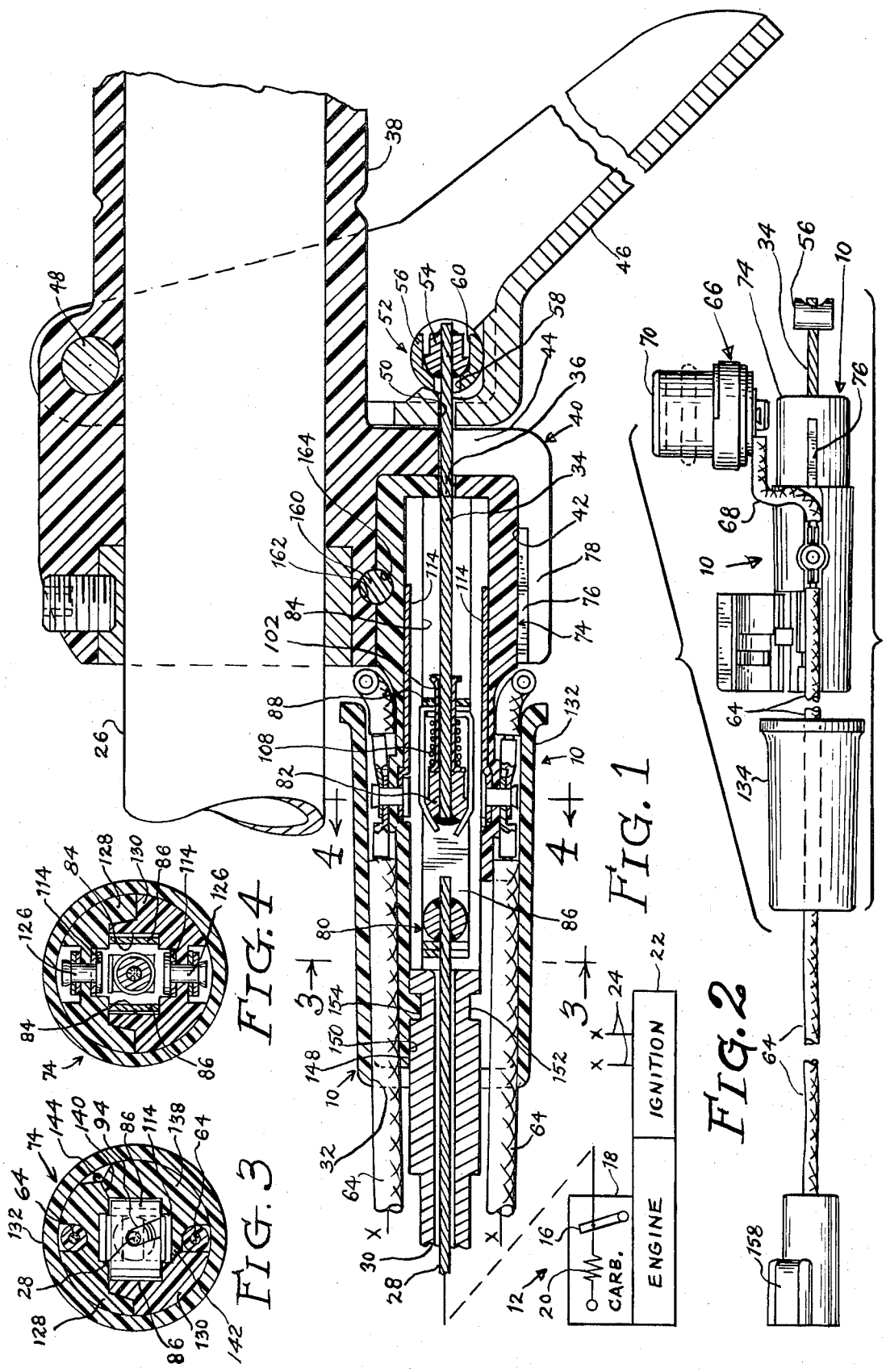

SAFETY SWITCH AND CONTROL SYSTEM FOR VEHICLES

This invention relates to a safety switch and an associated safety control system which are applicable to vehicles generally and to other control situations, but are particularly advantageous for use on snowmobiles.

Experience with snowmobiles has demonstrated that occasionally the throttle control of a snowmobile will freeze or stick in the open position. This creates a hazardous condition because it may be impossible to slow down the snowmobile sufficiently to negotiate a curve safely or perform some other maneuver. There have been instances in which the driver of a snowmobile has fallen off the vehicle when attempting to negotiate a curve at an excessive speed due to the sticking of the throttle control in the open position. In some cases, the riderless snowmobile has continued to travel some distance and has caused a serious accident.

Another hazardous situation is created when the engine of a snowmobile is started when the throttle is stuck or frozen in the open position. When the engine is started, it runs up to a high speed causing the engagement of the speed responsive clutch so that the snowmobile is propelled forward in an abrupt manner before the driver is ready to get on the vehicle. As a result, the riderless snowmobile may run away and cause an accident.

One object of the present invention is to provide a safety switch and a safety control system which disable the engine of the snowmobile or other vehicle when the throttle or other speed control member is stuck in the open position.

A further object is to provide such a safety control system which is particularly applicable to snowmobiles, but is also applicable generally to speed control systems for engines of various kinds.

A further object is to provide a control switch which is adapted to transmit force in a control system and is operable between two different switching states depending upon whether the normal force is being transmitted or not.

More specifically, it is an object of the present invention to provide a control switch which is adapted to be connected into a control cable or some other tension member and is adapted to be operated between two different switching states according to whether or not the cable is under tension.

The control system of the present invention may utilize a tension-responsive switch which is connected into the speed control cable for an engine. When the normal tension in the cable is lost due to sticking of the speed control member, the switch is operated to a different switching state so as to cause the engine to stop. Thus, for example, the switch may be arranged to short circuit the magneto or breaker points in the ignition system of an internal combustion engine, when the throttle control member sticks in the open position and thereby causes loss of the normal tension in the throttle control cable.

The control switch of the present invention may comprise first and second movable members adapted to transmit force in a control system or the like. In addition to being movable with the control cable or other member, along which the force is being transmitted, the first and second members are interconnected for relative lost motion between first and second relative positions. When normal force is being transmitted, relative movement of the members is caused to one of said positions against the biasing action of resilient means connected between the two members. When the force is not being transmitted, the members are moved to the other relative position by the resilient means. The movement of the movable members between the first and second relative positions causes switching means to be operated between two different switching states.

In one embodiment, the change between the switching states is produced by a camming element on one of the members effective to spread a pair of contact elements outwardly so as to engage elongated stationary contact elements in the form of bars, rails or the like. The stationary contact elements are sufficiently elongated to be engageable by the outward movement of the movable contact elements throughout the range of movement of the movable members.

Further objects, advantages and features of the present invention will appear from the following description, taken with the accompanying drawings, in which:

FIG. 1 is a longitudinal section taken through a throttle safety switch and various elements of the associated control system, to be described as an illustrative embodiment of the present invention.

FIG. 2 is an elevational view of the throttle safety switch in a partially assembled condition.

FIGS. 3 and 4 are cross sectional views taken generally along the lines 3—3 and 4—4 in FIG. 1.

Figure 5:
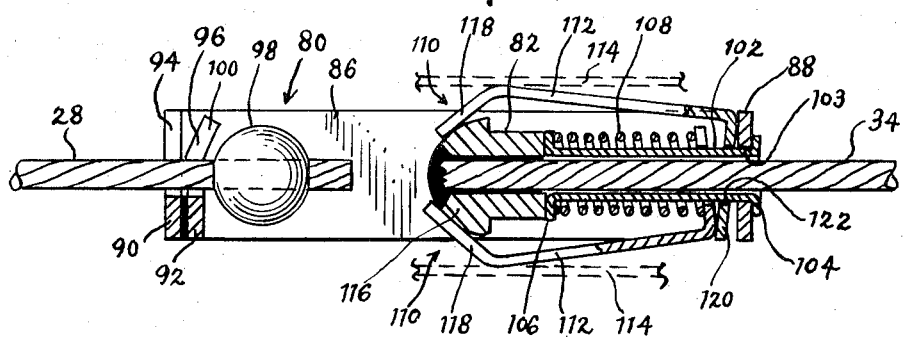

FIG. 5 is an enlarged longitudinal section showing the movable members and the contact elements of the switch.

Figure 6:
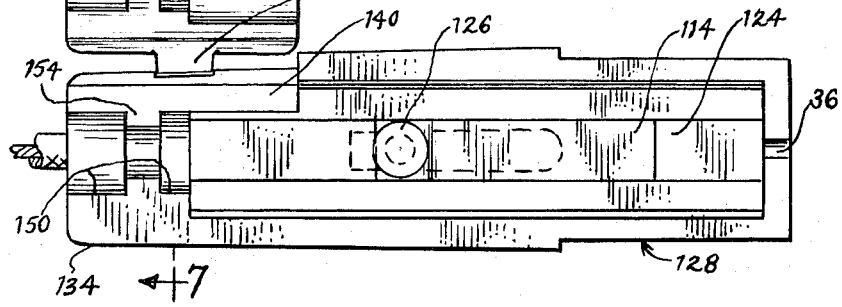

FIG. 6 is an elevational view of one of the half shells making up the body of the switch.

Figure 7:
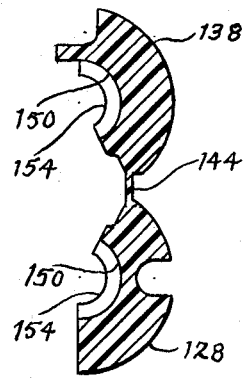

FIG. 7 is a cross section taken along the line 7—7 in FIG. 6.

Figure 8:
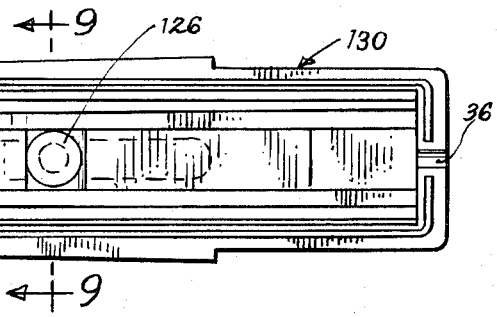

FIG. 8 is an elevational view showing the other half shell of the body.

Figure 9:
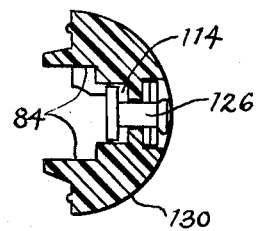

FIG. 9 is a cross section taken along the line 9—9 in FIG. 8.

As just indicated, FIGS. 1 and 2 illustrate a safety switch 10 which finds an important application in a control system 12 for an engine 14, which in this case is preferably in the form of an internal combustion engine for a snowmobile or some other vehicle. The engine 14 has a movable speed control member 16 which, in this case, is in the form of the throttle control lever on the carburetor 18 of the engine 14. The speed control member 16 is movable between minimum and maximum speed positions and is preferably biased toward its minimum speed position by resilient or yieldable means illustrated in the form of a spring 20.

The illustrated engine 14 also preferably comprises an ignition system 22 which may be disabled to stop the engine. For this purpose, the ignition system 22 has a pair of control leads or terminals 24 which may be connected together or short circuited so as to disable the ignition system. The control leads 24 may be connected across the primary circuit of the magneto in the ignition system 22, or across the breaker points, for example.

Provision is made for transmitting force to the speed control member 16 so that it may be moved from its minimum speed position toward its maximum speed position. In this way, the speed of the engine 14 can be controlled from a more or less remote point, such as the tiller or handlebar 26 of the snowmobile or other vehicle. As is often the case, a flexible cable or wire 28 is preferably employed in the illustrated control system 12 to transmit the operating force to the throttle or speed control member 16. The illustrated control cable 28 is of the type which is slidable within a protective flexible sheath 30.

It will be seen that the safety switch 10 is connected into the control cable 28. Thus, the illustrated cable 28 and its protective sheath 30 extend into one end of the safety switch 10 through an opening 32 therein. At the other end of the switch 10, another short section of control cable 34 extends out of the switch 10 through an opening 36. The mechanism within the switch, to be described in detail presently, provides a connection between the cable sections 28 and 34.

In this case, the handlebar or tiller 26 is fitted with a handgrip 38 which has a laterally projecting portion 40 forming a socket 42 adapted to receive and support the safety switch 10. The short control cable section 34 extends through a slot or opening 44 in the laterally projecting socket member 42. At its outer end, the cable section 34 is connected to a movable operating member illustrated in the form of a hand lever 46 mounted on and swingable about a pivot 48 connected to the handgrip 38. Suitable means are provided to connect the free end of the cable section 34 to the hand lever 46.

As illustrated, the end of the cable section 34 extends through a slot or opening 50 in the lever 46 and is connected to a swivel terminating device 52 illustrated as comprising a bead-shaped element 54, soldered or otherwise secured to the end of the cable 34 and a swivel member 56 which is held captive on the end of the cable 34 by the bead 54. The cable 34 extends loosely through an opening 58 in the swivel member 56 so that it is free to rotate and rock relative to the cable member. The swivel member 56 has a socket 60 for receiving the bead 54. It will be seen that the swivel member 56 normally engages the hand lever 46.

Tension is normally maintained in the control cable 28 by the return spring 20. The mechanism within the safety switch 10 transmits such tension to the cable section 34 which in turn transmits a corresponding force to the hand lever 46. By virtue of this force developed by the spring 20, the hand lever 46 is initially biased into engagement with the laterally projecting member 40 on the handgrip 38. Thus, the member 40 acts as a stop which determines the minimum speed position of the control cable 28 and the speed control member 16. When the speed of the engine 14 is to be increased, the hand lever 46 is moved away from the stop member 40 so as to increase the tension or pull on the cable members 34 and 28. In this way, the speed control member 16 is moved toward its maximum speed position.

Whenever the force on the hand lever 46 is released, the spring 20 is supposed to return the throttle or speed control member 16 to its closed or minimum speed position. It has been found, however, that occasionally the throttle or speed control member 16 will stick or become frozen in a partially open or fully open position, usually due to adverse operating conditions. Thus, for example, snow or moisture may somehow get into the lower end of the protective sheath 30 for the control cable 28 and may cause the formation of ice between the control cable 28 and the sheath 30. Ice may also form around the throttle control member 16 so that it may become frozen in an open position. When this occurs, the driver of the snowmobile or other vehicle loses control of the speed of the engine 14. This is a hazardous condition because the loss of control may cause an accident. For example, the driver may fall off the snowmobile while attempting to negotiate a turn at excessive speed. The riderless snowmobile may then continue to travel until it runs into something.

If the throttle control member 16 sticks or becomes frozen in its open position when the engine 14 is not operating, it is unsafe to start the engine because once started the engine may operate at high speed so as to cause engagement of the speed-responsive clutch between the engine and the drive track. As a result, the vehicle may travel away without a rider.

When the throttle control member 16 sticks or freezes in its open or high speed position, or in any partially open position, the tension is lost in the control cable 28 because the sticking of the control member 16 makes it impossible for the force of the spring 20 to be transmitted to the control cable 28. The safety switch 10 is adapted to be operated by the loss or change in the tension so as to stop the engine 14. When the control cable 28 is under tension, the switch 10 is in one switching state, and when the tension is lost, the switch 10 is changed to a different switching state which is utilized to disable the ignition system 22 of the engine.

The illustrated switch 10 has a pair of output leads 64 which are connected to the control leads 24 extending from the ignition system 22. When tension exists in the cable 28, the illustrated switch 10 preferably produces an open circuit between the leads 64 so that the ignition system 22 is fully operative. When the tension is lost in the cable 28, the switch 10 produces a closed circuit between the leads 64 with the result that the ignition system 22 is disabled.

As illustrated in FIG. 2, the control system may also include a manually operable switch 66 having a pair of output leads 68 connected to the respective output leads 64 of the safety switch 10. The switch 66 may be operated manually so as to disable the ignition system 22 by producing a closed circuit across the leads 64. The manually operable switch 66 may be of any known or suitable type, but is illustrated as being of the push-action type comprising a push button 70 which is depressed to actuate the switch 66. For example, the switch 66 may be adapted to change between two different switching states by successive depressions of the push-button 70. Thus, the switch 66 may be arranged to be shifted between a closed circuit condition and an open circuit condition by successive depressions of the push button 70. It will be understood that the manually operable switch 66 is adapted to be mounted in a convenient position on the handgrip 38 for easy operation by the driver.

The illustrated safety switch 10 comprises a stationary housing or casing 74 which may be formed in a plurality of parts, as will be described in detail presently. As previously indicated, the housing 74 is adapted to be received in the socket 42 which is formed in the laterally projecting portion 40 of the handgrip 38. To prevent rotation of the casing 74 in the socket 42, a key 76 may be formed on the casing and may be adapted to be received in the outer portion 78 of the slot 44 in which the cable section 34 is movably received, the slot 44 being formed in the laterally projecting portion 40 of the handgrip 38.

The illustrated switch 10 preferably comprises a movable member or carriage 80 which is adapted to be connected to the cable 28. The carriage 80 is adapted to move with the control cable 28 during normal adjustment of the throttle control member 16. The illustrated switch 10 also comprises a second movable member 82 connected to the short cable section 34 and movable therewith.

The casing 74 of the switch 10 is preferably provided with means for guiding the longitudinal movement of the first and second movable members 80 and 82, such means being illustrated as a pair of channels 84 formed within the casing 74. As illustrated, the first movable member or carriage 80 has a pair of elements 86 which are slidably received in the channels 84. Such elements 86 are illustrated in the form of longitudinally extending pairs of strips which are made of metal or some other suitable material.

As shown in FIGS. 1 and 5, the bars 86 may comprise the parallel legs of a single metal strip which is bent into a U-shaped form, with a transverse portion or leg 88 extending between the legs 86 at one end. In the illustrated construction, flanges 90 and 92 are bent from the bars 86 at the opposite end thereof and are formed with aligned slots 94 and 96 into which the cable 28 may be inserted. The flanges 90 and 92 may be welded or otherwise secured together.

The illustrated cable 28 has an end fitting 98 soldered or otherwise secured to the end thereof to engage the flange 92 so that the tension in cable 28 may be transmitted to the movable member or carriage 80. The flange 92 preferably has an ear or portion 100 which is bent toward the end fitting 98 so as to retain the end fitting 98 behind the flange 92. The bent ear 100 prevents the cable 28 from escaping accidentally from the slots 94 and 96.

As illustrated to best advantage in FIG. 5, the second movable member 82 is in the form of an end fitting which is soldered or otherwise secured to the inner end of the short cable section 34. It will be seen that the illustrated cable section 34 extends through an elongated sleeve 102 which in turn is slidable through an opening 103 in the transverse member 88 of the carriage 80. The illustrated sleeve 102 has outwardly projecting flanges 104 and 106 on its opposite ends. The flange 104 is engageable with the transverse member 88, while the flange 106 is engageable with the movable member 82.

Due to the movability of the sleeve 102 within the opening 103, the sleeve 102 has a limited amount of lost motion relative to the carriage 80. Likewise, the second movable member 82 has a corresponding amount of lost motion relative to the carriage 80. Normally, the sleeve 102 is movable with the movable member 82 so that the sleeve 102 may be regarded as an extension or component of the movable member 82.

Biasing means are preferably arranged to act between the sleeve 102 and the carriage 80 so that the sleeve 102 is resiliently biased toward one end of its range of lost motion relative to the carriage. In the illustrated construction, such biasing action is provided by a coil spring 108 mounted around the sleeve 102 and engaging the inner side of the end flange 106, the outer side of the end flange 106 being engageable with the member 82. The other end of the spring 108 acts against the transverse member 88 of the carriage 80, but with certain elements therebetween, as will be described presently.

In the absence of tension in the cable 28, the biasing action of the spring 108 causes the end flange 104 on the sleeve to engage the transverse member 88 of the carriage 80, as shown in FIG. 5. Thus, the end flange 104 serves as a stop to define a position representing one limit of the range of free movement between the sleeve 102 and the carriage 80.

When the control cable 28 is subject to normal operating tension due to the force of the return spring 20, the member 82 pushes against the end flange 106 on the sleeve 102 and causes the spring 108 to be compressed. The sleeve 102 is moved through the opening 103 in the transverse member 88 of the carriage 80 until the coil spring 108 is compressed fully to its solid length, as shown in FIG. 1. Thus, the spring 108 together with the end flange 106 acts as a stop to define the other limiting position of the sleeve 102 in its range of lost motion relative to the carriage 80. When the spring 108 is compressed solid, it transmits any movement of the short cable section 34 to the control cable 28.

The relative lost motion between the carriage or first movable member 80 on one hand, and the second movable member 82 together with the sleeve 102, on the other hand, is employed to operate switching or contact means 110 between two different switching states. One of such switching states is produced when the tension in the control cable 28 causes the spring 108 to be fully compressed, as shown in FIG. 1. The other switching state is produced when the tension in the control cable 28 is lost so that the spring 108 is fully extended with the result that the sleeve 102 and the movable member 82 are moved to the left until the flange 104 engages the transverse member 88 of the carriage 80, as shown in FIG. 5. In the illustrated construction, the first switching state results in an open circuit between the output leads 64 of the switch 10, while the second switching state produces a closed circuit across such leads.

In the illustrated switch 10, the switching means 110 comprise a pair of movable contactors in the form of contact arms 112 adapted to engage corresponding stationary contact elements 114. The contact arms 112 are mounted on the sleeve 102 and thus are movable with the cable elements 28 and 34. When normal tension exists in the cable 28, the contact arms 112 are retracted inwardly, as shown in FIG. 1, by the resilient biasing action of the spring 108. When the tension in the cable 28 is lost, the contact arms 112 are moved outwardly, as shown in FIG. 5, into engagement with the stationary contact elements 114. Thus, the contact arms 112 provide a closed circuit between the stationary contact elements 114.

The outward movement of the contact arms 112 is produced by a camming portion 116 on the movable member 82. Such camming portion 116 is preferably spherically rounded or of some other suitable shape. It will be seen that the camming portion 116 is engageable with inclined or angularly extending cam follower elements 118 bent inwardly from the movable contact arms 112. When the member 82 is moved to the left by the spring 108, as shown in FIG. 5, the camming portion 116 forces the cam follower elements 118 to move outwardly.

As illustrated in FIG. 5, the movable contact arms 112 are preferably mounted on the movable sleeve 102. Each of the illustrated contact arms 112 has a supporting portion 120 bent from the arm approximately at right angles thereto, and formed with an opening 122 through which the sleeve 102 is slidably movable. Each of the openings 122 is sufficiently oversize relative to the diameter of the sleeve 102 to provide for rocking movement of the corresponding contact arm 112 relative to the sleeve 102 between the inwardly retracted position of FIG. 1 and the outwardly swung position of FIG. 5.

It will be evident from FIG. 5 that the supporting portions or legs 120 of the contact arms 112 are interposed between the spring 108 and the transverse member 88 of the carriage 80. Thus, the spring 108 has a biasing action upon the movable contact arms 102. When the contact arms 112 are forced outwardly by the camming portion 116 of the movable member 82, as shown in FIG. 5, the rocking movement of the legs 120 causes compression of the spring 108. When the movable member 82 is moved away from the cam follower elements 118 on the contact arms 112 by the normal tension in the cable elements 28 and 34, the spring 108 exerts pressure upon the legs 120 with the result that the movable contact arms 112 are retracted inwardly, as shown in FIG. 1. When the spring 108 is compressed solid, it pushes the supporting arms 120 solidly against the transverse member 88 of the carriage 80.

The stationary contact elements 114, as illustrated in FIGS. 5, 6 and 8, are preferably elongated and positioned to extend along the range of movement of the contact arms 112 so as to be engageable by the contact arms throughout such range of movement, when the contact arms are caused to swing outwardly.

The illustrated stationary contact elements 114 are preferably in the form of metal bars or strips mounted in channels 124 within the casing 74. Terminals in the form of rivets 126 may be employed to connect the output leads 64 to the stationary contact strip 114. As shown to best advantage in FIG. 1, the rivets 126 are preferably arranged to be approximately flush with the stationary contact strips 114 so that the rivets are also engageable by the movable contact arms 112.

As will be clearly evident from FIGS. 3, 4 and 6–9, the casing 74 of the illustrated switch 10 preferably comprises a plurality of components which may be molded or otherwise formed from suitable resinous plastic materials, although other suitable materials may also be employed. The illustrated casing 74 is split longitudinally into two parts or half shells 128 and 130 which may be held together by a generally cup-shaped cap 132 adapted to be slipped around the mating rear portions 134 and 136 of the half shells 128 and 130.

The rear portion of the casing 74 also preferably comprises another portion or part 138 adapted to be received within the cap 132. The additional part 138 fits into cutouts 140 and 142 formed in the rear portions of the half shells 128 and 130. Preferably, the additional part 138 and the half shell 128 are molded in one piece with a thin flexible connecting hinge or flap 144 extending therebetween. It will be evident from FIGS. 3, 6 and 7 that the hinge 144 makes it possible to fold the additional part 138 into its assembled position within the cutouts 140 and 142.

The provision of the additional part or closure 138 facilitates the assembly of the switch 10, and particularly makes it easy to connect the control member 28 to the carriage 80, after the carriage has been inserted between the half shells 128 and 130. With the carriage thus assembled between the half shells 128 and 130, the flanges 90 and 92 at the rear end of the carriage 80 are accessible through the cutouts 140 and 142 so that the cable 28 can be inserted through the slots 94 and 96 in the flanges 90 and 92. Likewise, the end fitting 98 can be slipped into place in front of the flange 92.

In the illustrated switch 10, the casing 74 incorporates elements for anchoring the sheath 30 of the control cable 28. As shown in FIG. 1, the illustrated sheath 30 includes an end fitting or member 148 which in this case is generally cylindrical in shape. A generally cylindrical cavity or opening 150 is formed in the casing 74 to receive the end fitting 148. Various portions of the cavity 150 are formed in the parts 128, 130 and 138 of the casing 74. The illustrated end fitting 148 is formed with an annular groove or channel 152 which is adapted to interlock with ridge elements 154 on the casing parts 128, 130 and 138.

When the closure portion 138 of the casing 74 is in its open position, as shown in FIGS. 2 and 6, the end fitting 148 of the sheath 30 can be inserted into the portions of the cavity 150 within the casing parts 128 and 130. The closure part 138 is then swung into its closed position, as shown in FIG. 3, and is retained in such position by slipping the cap 132 around the closure part 138 and the rear end portions 134 and 136 of the casing parts 128 and 130.

It will be seen from FIG. 1 that the previously mentioned slot or opening 32 is formed in the rear of the cap 132 to provide a passage for the leads 64 and the end fitting 148 of the cable sheath 30. The cap 132 may be frictionally retained on the casing parts 128, 130 and 138, or may be cemented or otherwise secured in place. The ends of the leads 64 may be fitted with a suitable connector or plug 158, if desired, as shown in FIG. 2.

It will be recalled that the front end portion of the casing 74 is adapted to be received within the socket 42 in the laterally projecting portion 40 of the handgrip 38. The two parts 128 and 130 of the casing 74 are held together by the reception of the casing 74 in the socket 42. To retain the casing 74 in the socket 42, a pin 160 may be inserted into an opening 162 in the handgrip 38. The illustrated casing 74 is formed with a recess 164 adapted to interlock with the pin 160.

It may be helpful to summarize the operation of the safety switch 10 and the control system 12. Under normal conditions, the throttle return spring 20 maintains considerable tension in the control cable 28 so that the hand lever 46 is biased against the laterally projecting portion 40 of the handgrip 38. The tension in the cable 28 compresses the coil spring 108 to its solid length, as shown in FIG. 1.

The force transmitted by the spring 108 holds the movable contact arms 112 in their inwardly retracted position so that they do not engage the stationary contact strips or rails 114. When the hand lever 46 is moved away from the stop surface of the projecting member 40 to increase the speed of the engine 14, the pull exerted upon the cable section 34 is transmitted by the end member 82, the flange 106, the spring 108 and the legs 120 to the transverse member 88 of the carriage 80, which transmits the pull to the end fitting 98 on the control cable 28. Thus, the cable 28 moves the throttle or speed control member 16 from its minimum speed position toward its maximum speed position.

If the throttle or speed control member 16 happens to stick or freeze in its maximum speed position or in any intermediate speed position, the force of the spring 20 no longer can be transmitted to the control cable 28. Accordingly, the tension is lost in the control cable 28 as soon as the operator stops pulling on the control lever 46. The coil spring 108 expands to its position of maximum length, as shown in FIG. 5, so as to push the camming portion 116 of the member 82 against the inclined cam follower element 118 of the movable contact arms 112. The force developed by the spring 108 causes the contact arms 112 to swing outwardly into engagement with the stationary contact strips 114 to which the leads 64 are connected. The contact arms 112 thereby produce a closed circuit between the contact strips 114. This is true no matter what the position of the carriage 80 may be because the contact arms 112 are engageable with the stationary contact strips 114 throughout the range of movement of the carriage 80.

Due to the connection of the leads 64 to the ignition control leads 24, the closed circuit produced by the switch 10 short circuits or otherwise disables the ignition system 22 so that the engine 14 is stopped.

As soon as the throttle control member 16 is freed from its stuck or frozen condition, the spring 20 reestablishes the tension in the control cable 28 so that the contact arms 112 are swung inwardly away from the stationary contact elements 114, as shown in FIG. 1.

It will be understood that the supporting legs 120 of the movable contact arms 112 are in engagement with each other so that the arms 112 provide a closed circuit between the stationary contact strips 114, when the arms 112 are swung outwardly into engagement with the strips 114.

I claim:

1. An electrical switch operable by a change in the force transmitted between first and second control elements, comprising
    first and second movable members having means for connecting said movable members to the respective first and second control elements,
    said first and second movable members being movable with said first and second control elements,
    said first and second movable members having means interconnecting said members for relative movement between first and second positions,
    the transmission of force between said control elements being effective to cause relative movement of said first and second movable members to said first position,
    resilient means acting between said first and second movable members and biasing said members for relative movement to said second position,
    and switching means operable between two different switching states in response to relative movement of said members between said first and second positions,
    whereby one of said switching states is produced by normal transmission of force between said control elements, while the other switching state is produced in the absence of such transmission of force,
    said switching means comprising movable contact means mounted on one of said movable members and movable therewith,
    stationary contact means alongside the path of movement of said movable contact means and spaced laterally therefrom,
    and means operable by relative movement of said first and second movable members for moving said movable contact means laterally into and out of engagement with said stationary contact means.

2. A switch according to claim 1,
    in which said stationary contact means include a pair of stationary contact elements spaced laterally from said movable contact means,
    said movable contact means comprising a pair of movable contact elements movable laterally into and out of engagement with said stationary contact elements to form a conductive bridge therebetween.

3. An electrical switch operable by a change in the force transmitted between first and second control elements comprising,
    first and second movable members having means for connecting said movable members to the respective first and second control elements,
    said first and second movable members being movable with said first and second control elements,
    said first and second movable members having means interconnecting said members for relative movement between first and second positions,
    the transmission of force between said control elements being effective to cause relative movement of said first and second movable members to said first position,
    resilient means acting between said first and second movable members and biasing said members for relative movement to said second position,
    and switching means operable between two different switching states in response to relative movement of said members between said first and second positions,
    whereby one of said switching states is produced by normal transmission of force between said control elements, while the other switching state is produced in the absence of such transmission of force,
    said switching means comprising movable contact means mounted on one of said movable members and movable therewith,
    stationary contact means alongside the path of movement of said movable contact means,
    and means operable by relative movement of said first and second movable members for moving said movable contact means into and out of engagement with said stationary contact means,
    said last-mentioned means comprising a camming element movable with one of said movable members and engageable with said movable contact means.

4. An electrical switch operable by a change in the force transmitted between first and second control elements comprising,
    first and second movable members having means for connecting said movable members to the respective first and second control elements,
    said first and second movable members being movable with said first and second control elements, said first and second movable members having means interconnecting said members for relative movement between first and second positions, the transmission of force between said control elements being effective to cause relative movement of said first and second movable members to said first position, resilient means acting between said first and second movable members and biasing said members for relative movement of said second position, and switching means operable between two different switching states in response to relative movement of said members between said first and second positions, whereby one of said switching states is produced by normal transmission of force between said control elements, while the other switching state is produced in the absence of such transmission of force, said switching means comprising movable contact means mounted on one of said movable members and movable therewith, stationary contact means alongside the path of movement of said movable contact means, and means operable by relative movement of said first and second movable members for moving said movable contact means into and out of engagement with said stationary contact means, at least one of said contact means being elongated to provide for engagement between said movable and stationary contact means throughout the range of movement of said movable members.

5. An electrical switch operable by a change in the force transmitted between first and second control elements, comprising, first and second movable members having means for connecting said movable members to the respective first and second control elements, said first and second movable members being movable with said first and second control elements, said first and second movable members having means interconnecting said members for relative movement between first and second positions, the transmission of force between said control elements being effective to cause relative movement of said first and second movable members to said first position, resilient means acting between said first and second movable members and biasing said members for relative movement to said second position, and switching means operable between two different switching states in response to relative movement of said members between said first and second positions, whereby one of said switching states is produced by normal transmission of force between said control elements, while the other switching state is produced in the absence of such transmission of force, said switching means comprising a pair of movable contactors mounted on one of said movable members and movable therewith, a pair of stationary contact elements disposed along the paths of movement of said contactors, and means operable by relative movement of said first and second members for moving said contactors into and out of engagement with said contact elements.

6. An electrical switch according to claim 5, in which said last-mentioned means include camming means disposed on one of said movable members and engageable with said contactors.

7. An electrical switch according to claim 5, in which said stationary contact elements are elongated in the direction of movement of said movable members to provide for engagement between said contactors and said contact elements throughout the range of movement of said contactors.

8. An electrical switch according to claim 5, in which said contactors are in the form of contact arms swingably mounted on one of said movable members for outward movement into engagement with said stationary contact elements.

9. An electrical switch according to claim 5, in which said resilient means include an element biasing said contactors away from engagement with said contact elements.

10. An electrical switch operable by a change in the tension transmitted between first and second tension elements, comprising a casing, first and second movable members mounted in said casing for movement therein and having means for connecting said movable members to the respective first and second tension elements, said first and second movable members being movable with said first and second tension elements, said first and second movable members having means interconnecting said members for relative lost motion between first and second positions, the normal transmission of tension between said tension elements being effective to cause relative movement of said first and second movable members to said first position, resilient means acting between said first and second movable members and biasing said members for relative movement to said second position, and switching means operable between two different switching states in response to relative movement of said first and second movable members between said first and second positions, whereby one of said switching states is produced by normal transmission of tension between said tension elements, while the other switching state is produced in the absence of such transmission of tension, said switching means comprising a movable contact element mounted on one of said movable members, a stationary contact element mounted on said casing opposite said movable contact element and spaced laterally therefrom, and means operable by relative movement between said first and second movable members for moving said movable contact element laterally into and out of engagement with said stationary contact element.

11. A switch according to claim 10, including a second movable contact element mounted on said one of said movable members, and a second stationary contact element mounted on said casing opposite said second movable contact element and spaced laterally therefrom, said second movable contact element being movable laterally by said last-mentioned means into and out of engagement with said second stationary contact element, said movable contact elements being connected together to form a conductive bridge between said stationary contact elements.

12. An electrical switch operable by a change in the tension transmitted between first and second tension elements, comprising a casing, first and second movable members mounted in said casing for movement therein and having means for connecting said movable members to the respective first and second tension elements, said first and second movable members being movable with said first and second tension elements, said first and second movable members having means interconnecting said members for relative lost motion between first and second positions, the normal transmission of tension between said tension elements being effective to cause relative movement of said first and second movable members to said first position, resilient means acting between said first and second movable members and biasing said members for relative movement to said second position, and switching means operable between two different switching states in response to relative movement of said first and second movable members between said first and second positions, whereby one of said switching states is produced by normal transmission of tension between said tension elements, while the other switching state is produced in the absence of such transmission of tension, said switching means comprising a movable contact element mounted on one of said movable members, a stationary contact element mounted on said casing opposite said movable contact element, and means operable by relative movement between said first and second movable members for moving said movable contact element into and out of engagement with said stationary contact element, said last-mentioned means including a camming element operable by one of said movable members and engageable with said movable contact element.

13. An electrical switch operable by a change in the tension transmitted between first and second tension elements, comprising a casing, first and second movable members mounted in said casing for movement therein and having means for connecting said movable members to the respective first and second tension elements, said first and second movable members being movable with said first and second tension elements, said first and second movable members having means interconnecting said members for relative lost motion between first and second positions, the normal transmission of tension between said tension elements being effective to cause relative movement of said first and second movable members to said first position, resilient means acting between said first and second movable members and biasing said members for relative movement to said second position, and switching means operable between two different switching states in response to relative movement of said first and second movable members between said first and second positions, whereby one of said switching states is produced by normal transmission of tension between said tension elements, while the other switching state is produced in the absence of such transmission of tension, said switching means comprising a movable contact element mounted on one of said movable members, a stationary contact element mounted on said casing opposite said movable contact element, and means operable by relative movement between said first and second movable members for moving said movable contact element into and out of engagement with said stationary contact element, one of said contact elements being elongated to provide for engagement between said movable and stationary contact elements along the path of movement of said first and second movable members.

14. An electrical switch operable by a change in the tension transmitted between first and second tension elements, comprising a casing, first and second movable members mounted in said casing for movement therein and having means for connecting said movable members to the respective first and second tension elements, said first and second movable members being movable with said first and second tension elements, said first and second movable members having means interconnecting said members for relative lost motion between first and second positions, the normal transmission of tension between said tension elements being effective to cause relative movement of said first and second movable members to said first position, resilient means acting between said first and second movable members and biasing said members for relative movement to said second position, and switching means operable between two different switching states in response to relative movement of said first and second movable members between said first and second positions, whereby one of said switching states is produced by normal transmission of tension between said tension elements, while the other switching state is produced in the absence of such transmission of tension, said switching means comprising a movable contact element mounted on one of said movable members, a stationary contact element mounted on said casing opposite said movable contact element, and means operable by relative movement between said first and second movable members for moving said movable contact element into and out of engagement with said stationary contact element, said stationary contact element being in the form of an elongated contact member mounted on said casing for engagement by said movable contact element throughout the range of movement of said movable members.

15. An electrical switch operable by a change in the tension transmitted between first and second tension elements,
comprising a casing,
first and second movable members mounted in said casing for movement therein and having means for connecting said movable members to the respective first and second tension elements,
said first and second movable members being movable with said first and second tension elements,
said first and second movable members having means interconnecting said members for relative lost motion between first and second positions,
the normal transmission of tension between said tension elements being effective to cause relative movement of said first and second movable members to said first position,
resilient means acting between said first and second movable members and biasing said members for relative movement to said second position,
and switching means operable between two different switching states in response to relative movement of said first and second movable members between said first and second positions,
whereby one of said switching states is produced by normal transmission of tension between said tension elements, while the other switching state is produced in the absence of such transmission of tension,
said first movable member comprising a carriage movable in said casing,
said second movable member being slidably mounted on said carriage,
said resilient means comprising spring means acting between said carriage and said second movable member,
said switching means comprise stationary contact means on said casing,
movable contact means mounted on one of said movable members,
and camming means operable by relative movement between said carriage and said second movable member for moving said movable contact means into engagement with said stationary contact means.

16. An electrical switch according to claim 15, in which said stationary contact means comprise a pair of elongated contact elements on said casing, said movable contact means comprising a pair of contactors movable into and out of engagement with said stationary contact elements,
said camming means being operable to move said contactors into and out of engagement with said stationary contact elements.

17. An electrical switch operable by a change in the tension transmitted between first and second tension elements,
comprising a casing,
first and second movable members mounted in said casing for movement therein and having means for connecting said movable members to the respective first and second tension elements,
said first and second movable members being movable with said first and second tension elements,
said first and second movable members having means interconnecting said members for relative lost motion between first and second positions,
the normal transmission of tension between said tension elements being effective to cause relative movement of said first and second movable members to said first position.
resilient means acting between said first and second movable members and biasing said members for relative movement to said second position,
and switching means operable between two different switching states in response to relative movement of said first and second movable members between said first and second positions,
whereby one of said switching states is produced by normal transmission of tension between said tension elements, while the other switching state is produced in the absence of such transmission of tension,
said first movable member including a carriage movably mounted in said casing,
said second movable member including a sleeve movable on said carriage,
said sleeve having elements limiting the range of lost motion between said sleeve and said carriage,
said switching means including a pair of movable contact arms swingably mounted on said sleeve,
a pair of stationary contact elements mounted on said casing,
and means operable by relative movement between said carriage and said sleeve for moving said contact arms into and out of engagement with said stationary contact elements.

18. A switch according to claim 17, in which said last-mentioned means include camming means operable by said sleeve and engageable with said contact arms.

19. A vehicle safety control system,
including an engine having a speed control member movable between minimum and maximum speed positions,
including an engine having a speed control member movable between minimum and maximum speed positions,
a flexible control cable having a first end connected to said speed control member and movable therewith,
resilient means biasing said speed control member and said control cable toward said minimum speed position,
said control cable having a second end,
stop means limiting movement of said second end of said control cable toward said minimum speed position whereby said resilient means normally maintains tension in said control cable,
and switching means connected into said control cable and operable to a first switching state by the normal tension in said control cable,
said switching means including means for operating said switching means to a second switching state when the tension in said cable is diminished,
said engine having an electrical stopping system connected to said switching means and effective to stop the engine when said switching means is operated to said second switching state,
whereby said engine is stopped automatically when tension is lost in said control cable, said control cable including first and second sections, said switching means being connected between said sections, said switching means including first and second movable members connected to and movable with said first and second sections, means interconnecting said movable members for relative lost motion between first and second relative positions, resilient means acting between said movable members in opposite to the normal tension in said cable, movable contact means on one of said movable members, stationary contact means opposite said movable contact means, and means operable by relative movement between said movable members for moving said movable contact means into and out of engagement with said stationary contact means.

20. A vehicle safety control system, including an engine having a speed control member movable between minimum and maximum speed positions, a flexible tension member having a first end connected to said speed control member and movable therewith, resilient means biasing said speed control member and said tension member toward said minimum speed position, said tension member having a second end, stop means limiting movement of said second end of said tension member toward said minimum speed position whereby said resilient means normally maintains tension in said tension member, and switching means connected to said tension member and operable to a first switching state by the normal tension in said tension member, said switching means including means for operating said switching means to a second switching state when the tension in said tension member is diminished, said engine having an electrical stopping system connected to said switching means and effective to stop the engine when said switching means is operated to said second switching state, whereby said engine is stopped automatically when tension is lost in said tension member, said tension member including first and second elements, said switching means being connected between said elements, said switching means including first and second movable members connected to and movable with said first and second elements, means interconnecting said movable members for relative lost motion between first and second relative positions, resilient means acting between said movable members in opposition to the normal tension in said tension member, movable contact means on one of said movable members, stationary contact means opposite said movable contact means, and means operable by relative movement between said movable members for moving said movable contact means into and out of engagement with said stationary contact means.

21. A system according to claim 20, in which said last-mentioned means comprise a camming element movable with one of said movable members and engageable with said movable contact means.

22. A system according to claim 20, in which at least one of said contact means is elongated to provide for engagement between said movable and stationary contact means throughout the range of movement of said movable members.

* * * * *